United States Patent [19]
Neale

[11] Patent Number: 6,129,419
[45] Date of Patent: Oct. 10, 2000

[54] ADJUSTABLE COMFORT SEAT

[75] Inventor: Colin G. Neale, Northville, Mich.

[73] Assignee: Magna Interior Systems Inc., Aurora, Canada

[21] Appl. No.: 09/379,771

[22] Filed: Aug. 24, 1999

Related U.S. Application Data

[63] Continuation of application No. 09/133,593, Aug. 13, 1998, abandoned.
[60] Provisional application No. 60/055,733, Aug. 13, 1997.

[51] Int. Cl.[7] .................................................. B60N 2/66
[52] U.S. Cl. ..................................... 297/284.4; 297/284.6
[58] Field of Search ............................. 297/284.4, 284.6, 297/284.1, 452.41

[56] References Cited

U.S. PATENT DOCUMENTS

| | | | |
|---|---|---|---|
| 4,580,837 | 4/1986 | Bayley | 297/284.6 X |
| 4,589,695 | 5/1986 | Isono | 297/284.6 X |
| 5,076,643 | 12/1991 | Colasanti et al. | 297/284.6 |
| 5,082,326 | 1/1992 | Sekido et al. | 297/284.6 |
| 5,137,329 | 8/1992 | Neale | 297/284.6 |
| 5,280,997 | 1/1994 | Andres et al. | 297/284.6 X |
| 5,558,398 | 9/1996 | Santos | 297/284.6 X |
| 5,772,281 | 6/1998 | Massara | 297/284.6 X |

FOREIGN PATENT DOCUMENTS 0205238  12/1982  Japan ................................. 297/284.6

OTHER PUBLICATIONS

Commercial activity statement and supporting documents.

*Primary Examiner*—Peter R. Brown
*Attorney, Agent, or Firm*—Howard & Howard

[57] ABSTRACT

A vehicle seat has a seat back hingedly connected to a seat cushion. The seat back includes a frame, an actuator and a seat cover. The frame has a support member at a lower lumbar region thereof. The actuator is mounted on the support member. The seat cover envelopes the frame. The seat cover is made of a foam backed material and has a rigid orthotically shaped form. The foam backed material biases the form against the actuator. The actuator is expandable to effect a movement of the form. The form is movable relative to the actuator in response to pressure applied by an occupant of the vehicle seat.

7 Claims, 6 Drawing Sheets

June 2020

ADJUSTABLE COMFORT SEAT

RELATED APPLICATIONS

This application is a continuation of co-pending application Ser. No. 09/133,593 filed on Aug. 13, 1998, now abandoned, which claims the benefit of provisional application Ser. No. 60/055,733, filed on Aug. 13, 1997.

FIELD OF INVENTION

This invention relates to an adjustable comfort seat for a vehicle. In particular this invention relates to a vehicle seat which can be orthotically adjusted to conform to the contours of the occupant of the seat.

BACKGROUND OF INVENTION

A vehicle seat has a foam trim pad which contorts the occupant's torso to provide support at varying levels of comfort depending on the frame, suspension and adjustment system which supports the trim pad. Since one size does not fit all occupants, a vehicle seat can be provided with an adjustment device to provide arbitrary articulation to the frame assembly with the goal of altering the supportive contours and thereby improve perceived comfort.

U.S. Pat. No. 5,137,329, entitled: "Articulated Lumbar Support for A Seat" provides a user adjustable lumbar support apparatus for inclusion in a seat back, comprising an essentially rigid back plate, a front plate having an orthotic lumbar support contour and a multi-chambered fluid actuator including at least a pair of independently inflatable chambers arranged vertically one chamber above the other. The fluid actuator is a bladder containing separated chambers. Fluid under pressure is admitted and vented separately to and from each chamber to alter the positional relationship of the front plate to the back plate so the lumbar support contour can be adjusted to a position giving optimum support at a desired elevation along the seat back. The three elements are joined by an elastic strap.

The fluid actuator merely raises or lowers to the pressure point of the front plate to a desired elevation. The fluid actuator allows some rotational movement of the front plate relative to the back plate. However since the front plate is coupled to the rear plate by an elastic strap, only a limited amount of vertical movement is permissible and thus providing a limited amount of adjustability of the seat for the occupant.

SUMMARY OF INVENTION

The disadvantages of the prior art may be overcome by providing a vehicle seat having a fully adjustable lumbar support and side bolsters, which responsively adjust to the pressure applied by an occupant of the seat.

According to one aspect of the invention, there is provided a vehicle seat which has a seat back hingedly connected to a seat cushion. The seat back includes a frame, an actuator and a seat cover. The frame has a support member at a lower lumbar region thereof. The actuator is mounted on the support member. The seat cover envelopes the frame. The seat cover is made of a foam backed material and has a rigid orthotically shaped form. The foam backed material biases the form against the actuator. The actuator is expandable to effect a movement of the form. The form is movable relative to the actuator in response to pressure applied by an occupant of the vehicle seat.

DESCRIPTION OF THE DRAWINGS

In Figures which illustrate embodiments of the invention.

DETAILED DESCRIPTION OF THE INVENTION

Figure 1:
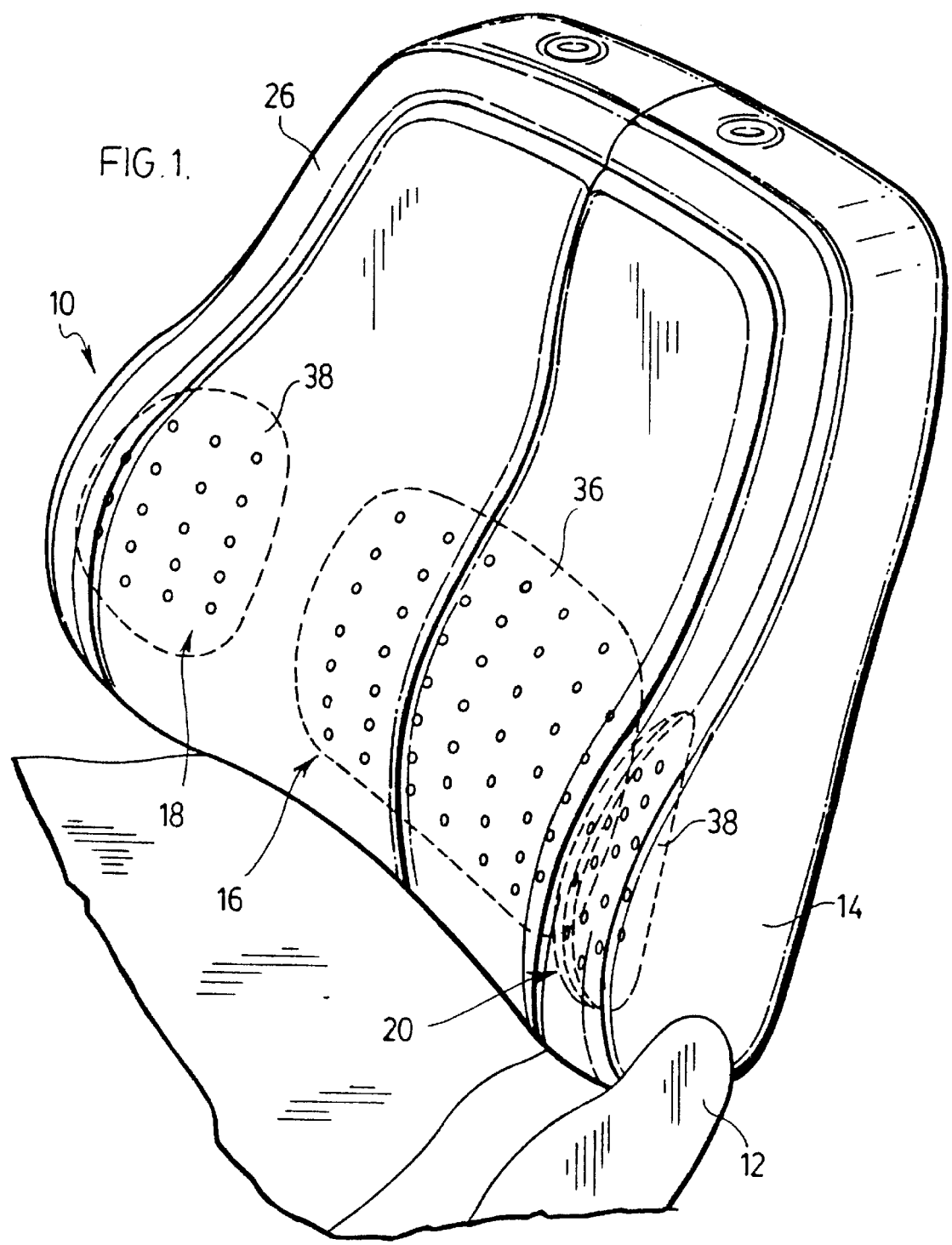
FIG. 1 is a perspective view of a comfort seat incorporating the principles of the present invention.

Referring to FIG. 1, there is illustrated a comfort seat 10 of the present invention. Seat 10 generally comprises a seat cushion 12 hingedly connected to a seat back 14 in a conventional manner. Seat back 14 is contoured in a conventional manner, defining a lower lumbar region 16 and side bolsters 18 and 20.

Figure 2:
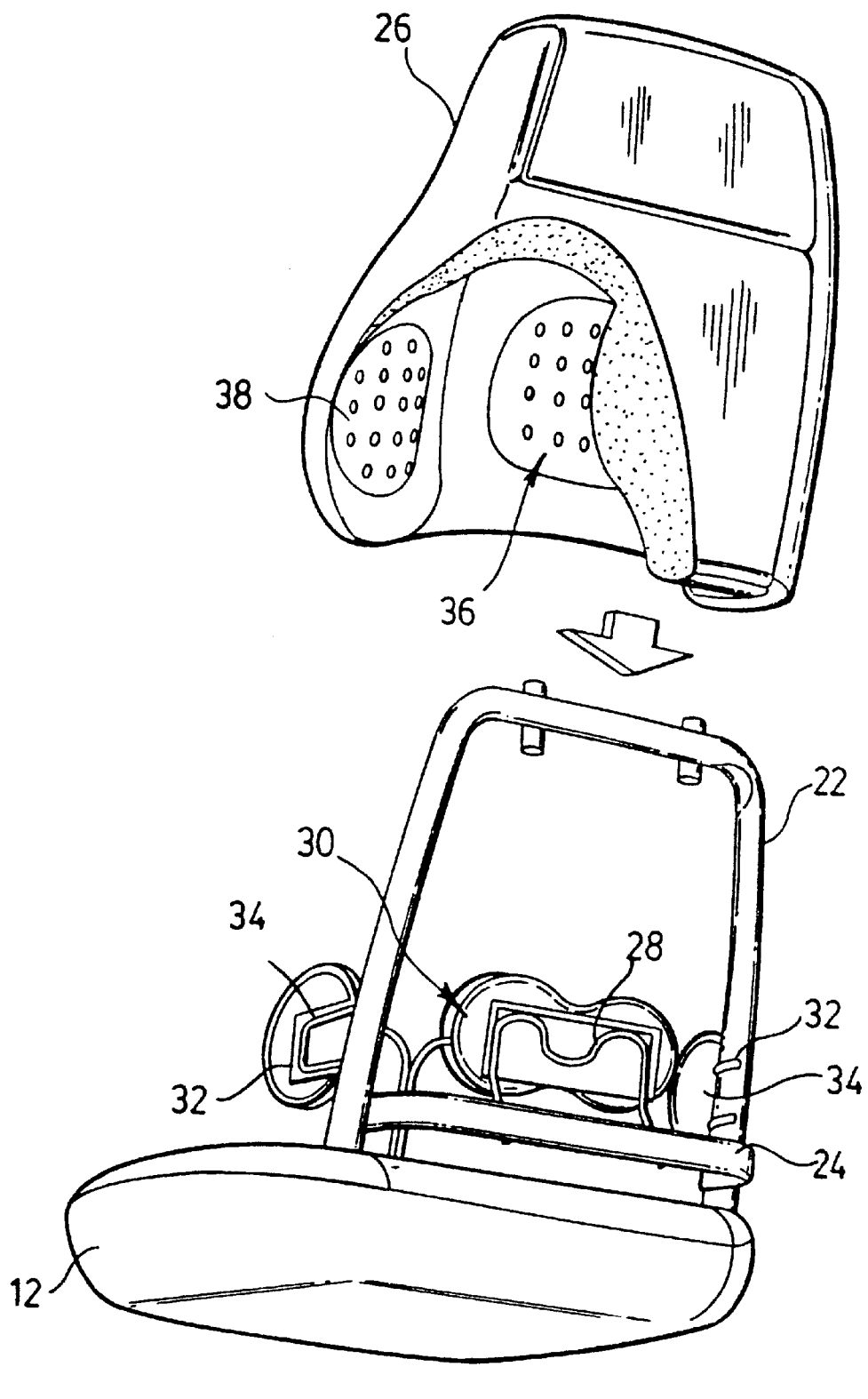
FIG. 2 is an exploded perspective view of the comfort seat of FIG. 1.
Figure 3:
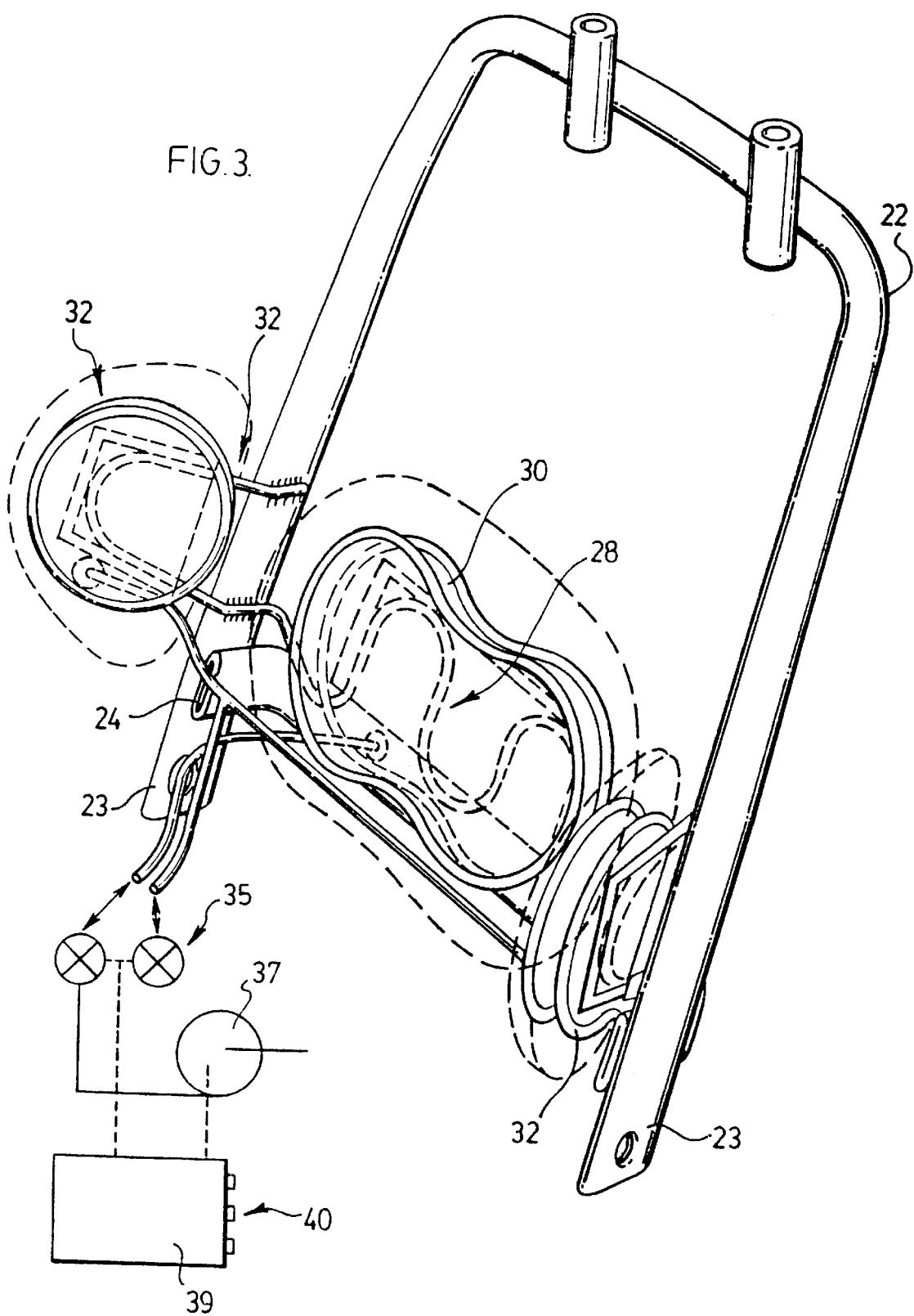
FIG. 3 is a perspective view of the seat frame of the comfort seat of FIG. 1.

Referring to FIG. 2, the seat 10 is illustrated with the cover 26 of the seat back 14 separated from the seat back frame 22. Frame 22 is generally an inverted U-shape having at each end thereof hinges 23 for connecting the seat back frame 22 to the frame of the seat cushion 12. The frame 22 has an arcuate support member 24 extending from side to side thereof i.e., between first and second sides. An inverted W-shaped wire frame 28 is centrally located along the support 24 and extends upwardly and forwardly in the lower lumbar region 16 of the seat back 14. An actuator 30 is mounted on wire frame 28.

A pair of C-shaped wire bolster frames 32 extend forwardly from each side of the frame 22. Bolster actuators 34 are mounted on each of the wire frames 32. The actuators 34 are generally positioned in the region of the side bolsters 18 and 20.

The cover 26 is foam backed material which is commonly used on North American vehicle seating. The inner surface of the cover 26 is provided with a rigid orthotic form 36. Preferably, orthotic form 36 is made from a rigid plastic material and contoured to the general shape of a human back in a sitting position. The form 36 can be molded separately and then adhered to the inner surface of cover 26 or can be molded directly thereto. In the preferred embodiment, form 36 has a series of perforations which can be used for trim tie down.

The inner side regions of the cover 26 is also provided with orthotic side forms 38. Side forms 38 are generally arcuate. The forms 38 can be molded separately and then adhered to the inner surface of cover 26 or can be molded directly thereto.

The cover 26 has a general shaping of the seat back 14 and envelopes over the frame 22 and is closed at its lower end. Form 36 will be generally positioned directly in front of the actuator 30 for movement in response thereto. The shaping of the foam will bias the form 36 against the actuator 30. Forms 38 will be generally positioned in front of the actuators 34 and will biased into engagement by the shape of the foam of cover 26.

Preferably actuators 30 and 34 are pneumatically inflated bladders. However, servo actuators or other types of actuators, both power and manually operated, could also be used in the present invention. Actuators 30 and 34 are provided with a pump 37 with separate connections and valves 35 thereto-for separate inflation and deflation thereof. A controller 39 is operable connected to the pump and valves and can be operated by discrete buttons 40 on the side of the seat 10 for effecting the inflation and deflation.

Each of the actuators 30 and 34 can be actuated or inflated separately and to different degrees. In this manner, each occupant of the vehicle seat 10 can adjust the seat for personal comfort. If the actuator 30 is expanded or inflated, the lower lumbar region of the seat back 14 will be urged forwardly which will in turn urge the form 36 forwardly. Since the form 36 is not connected to the actuator 30, the foam of cover 26 will act as a hinge about the periphery of the form 36. Thus, form 36 is free to move relative to the actuator 30, up and down or side to side, in response to the pressure applied by the back of the occupant. In this manner, the single inflation of the actuator 30 will react in a movement of the form 36 which will be personal to each occupant.

Similarly, side actuators 34 can be individually inflated to move the side bolster regions 18 and 20. The forms 38 will react to the pressure applied by the occupant in a similar manner as the form 36.

Figure 4:
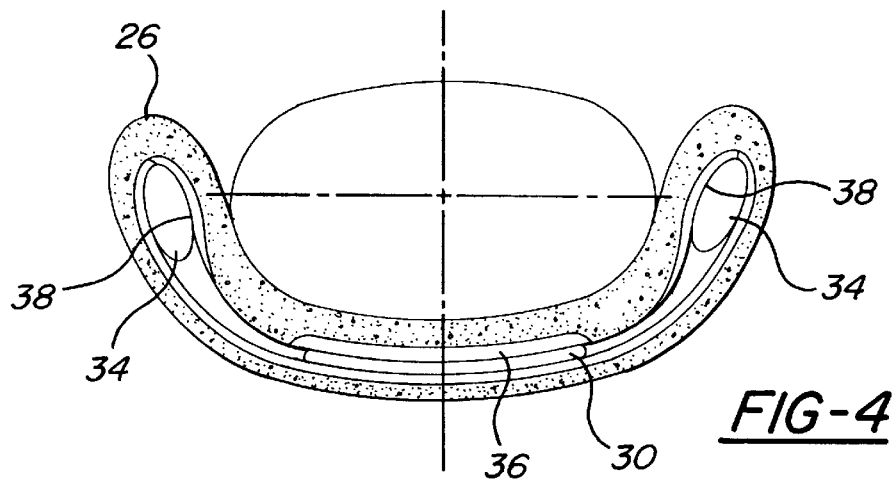
FIGS. 4–6 are schematic illustrations of the comfort seat of FIG. 1 in various states of deployment.
Figure 5:
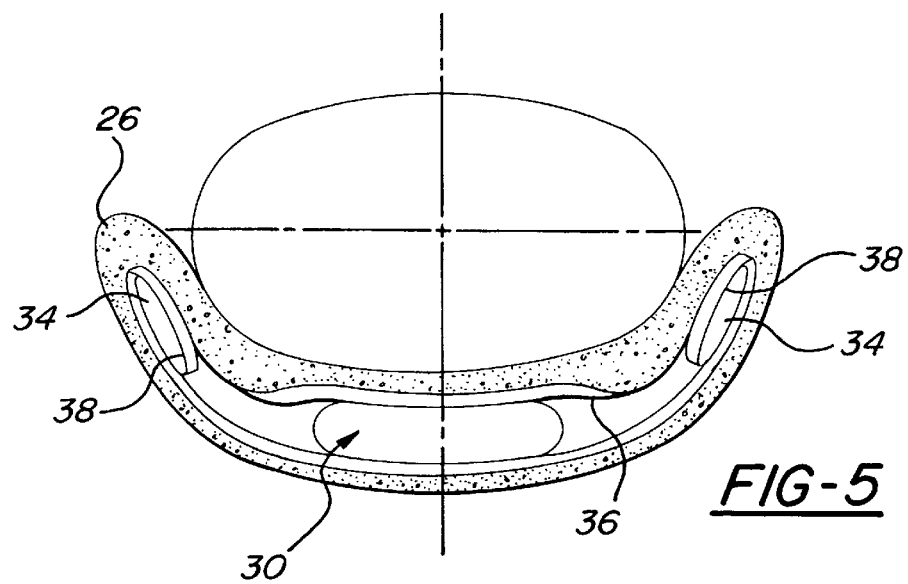
Figure 6:
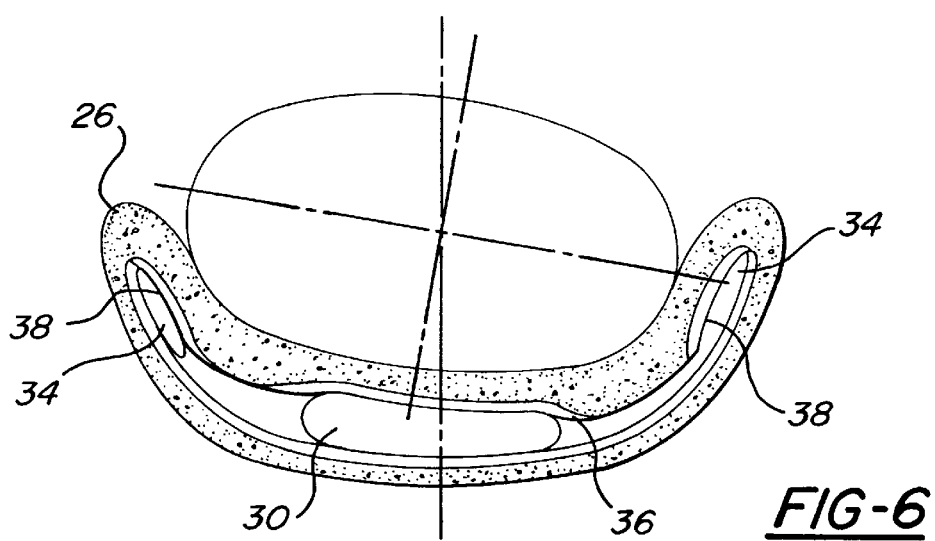

As illustrated schematically in FIGS. 4–6, a person with a small torso and long legs will only inflate the side actuators 34 to be comfortably positioned. A person with a large torso and short legs would only inflate the lumbar actuator 30. If the occupant rotates in the seat 10 for whatever reason, the form 36 will react and move in response to the rotated pressure pattern of the occupant.

It is apparent to those skilled in the art that the actuators 30 and 34 could be replaced by linear actuators, either mechanical or servo. It is only necessary to effect a forward or rearward movement of the form 36 in the general lower lumbar region of the seat back 14. Once the movement has been effected, the pressure of the occupant will effect the necessary reactionary movement to position the form 36 in a comfortable position.

Figure 7:
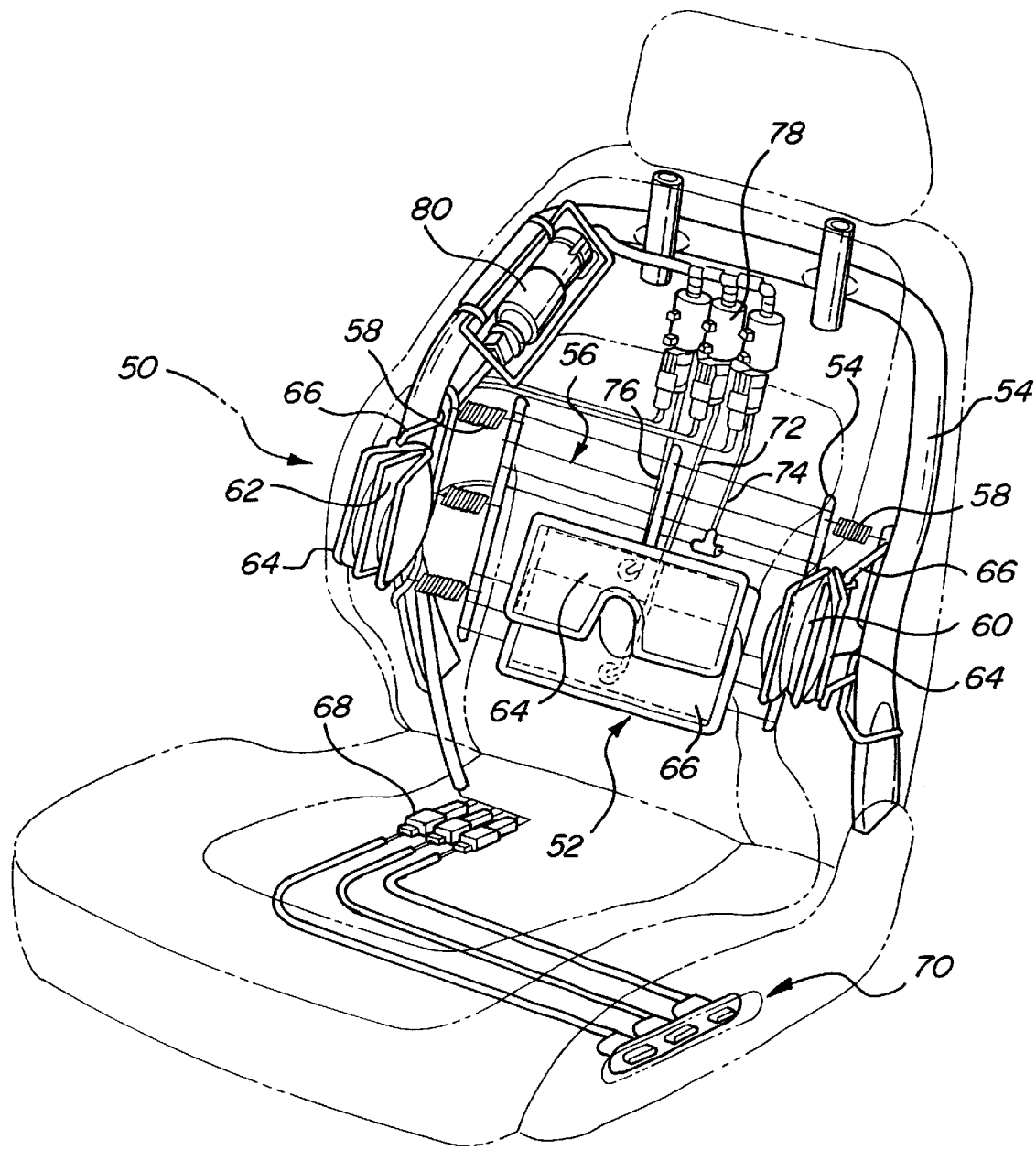
FIG. 7 is a perspective view of a second embodiment of a comfort seat of the present invention.
Figure 8:
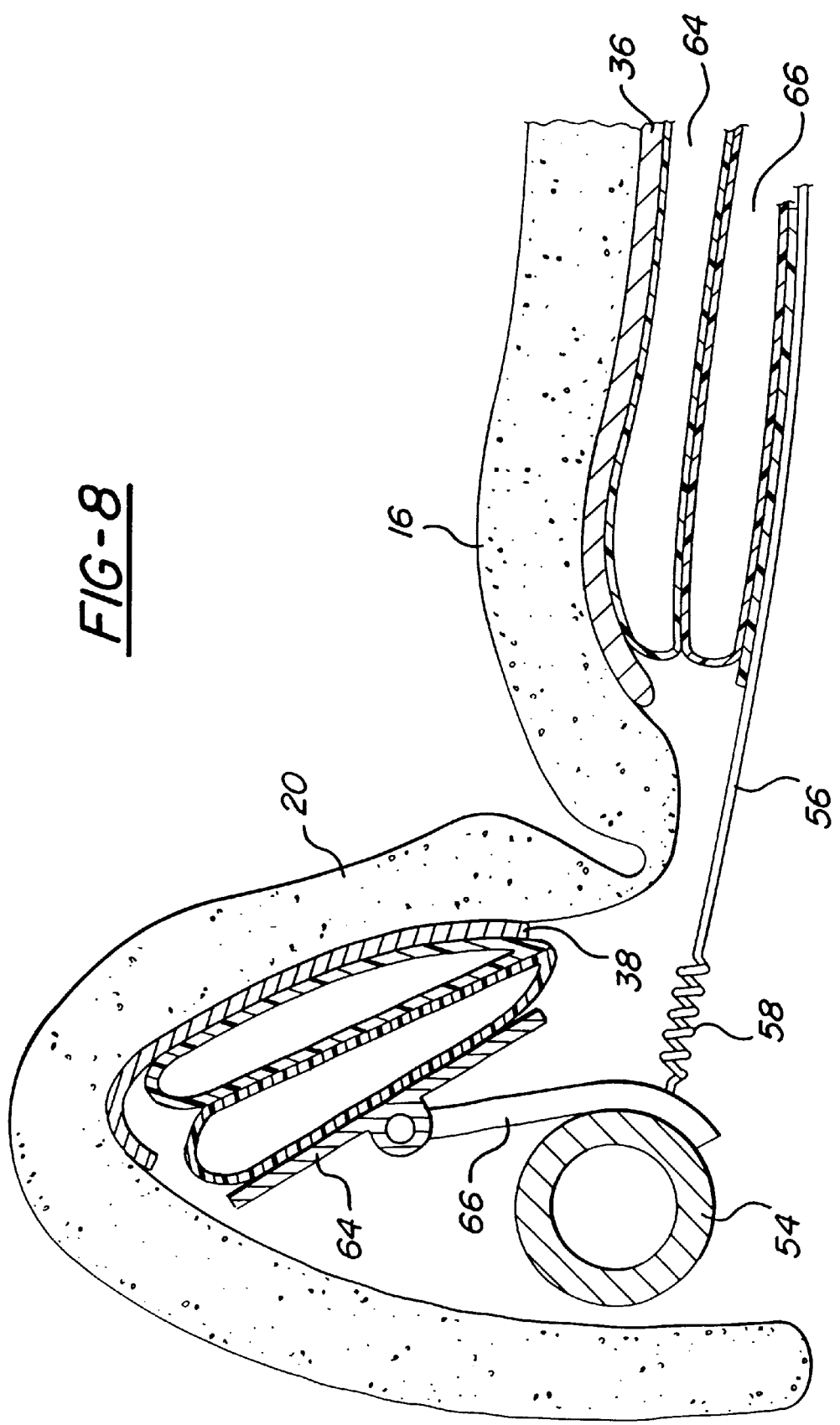
FIG. 8 is a partial sectional view of a left portion of the seat back of the embodiment of FIG. 7.

Referring to FIG. 7, a second embodiment of the present invention is illustrated. The comfort seat comprises an actuator 52 which is supported within the seat back frame 54 by a flexolator wire frame 56 which is then suspended by a series of springs 58 attached on either side of the seat back frame 54. As is well known in the art, a flexolator wire frame 56 comprises a plurality of wires strung between transverse stringers. The coil springs 58 interconnect the seat back and the stringers. A left actuator 60 and a right actuator 62 are mounted on a respective pivoting pad 64 which is pivotally mounted on wire frame 66 which extends forwardly from either side of the seat back frame 54. Actuators 60 and 62 will positional adjust to changes in the pressure therein. Preferably, the actuators 60 and 62 are bi-fold wing air cells and actuator 52 comprises a pair of overlapping lumbar air cells 64 and 66.

All of the pneumatic components of the electro-pneumatic control and actuation are preferably integrated into the seat back. The electrical functions required to control the pneumatic actuation are routed through electrical connectors 68 in the seat cushion. A control panel 70 is mounted for activation by the occupant. A series of three pneumatic pressure lines 72, 74, 76 communicate with the actuators 52, 62 and 64 through three independent controls valves 78. An air compressor 80 communicates with the valves 78 and provides fluid under pressure to the actuators 52, 62 and 64 for parallel distribution.

The control panel 70 has a series of three double pole, double throw switches. Two independent switches separately control the two lumbar air cells 64, 66, and one switch simultaneously controlling the left bi-fold wing air cell 60 and the right bi-fold wing air cell 62. Electrical signals from the control device 60 are routed to a cluster of electrical connectors 68 and into the electrically controlled pneumatic control valves 66.

A single air feed line 74 provides air pressure to inflate or deflate both the left 60 and right 62 wing air cells simultaneously, thus the pressure applied to both cells is always the same. There are two separate air feed lines 72, 76 provide fluid to the two lumbar air cells 64, 66.

The comfort seat 60 of the second embodiment operates in the same manner as the first embodiment. However, with the additional air cell for the lumbar support greater flexibility and adjustment can be achieved. It is now apparent to those skilled in the art that the flexolator 56 will provide a "softer" seat and the wire frame 28 for supporting the lumbar actuator will provide a "firmer" or "sportier" seat.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

What is claimed is:

1. A vehicle seat comprising;
    a seat back having first and second sides,
    an actuator supported by said seat back,
    a cover for covering said seat back,
    a shaped form secured to said cover and held against said actuator by said cover,
    a resilient frame supporting said actuator and movably secured to said seat back whereby the pressure of an occupant will effect reactionary movement to position the form in a comfortable position.

2. An assembly as set forth in claim 1 wherein said resilient frame includes at least one spring element connected to said seat back.

3. An assembly as set forth in claim 1 wherein said resilient frame is defined by a wire connected to said seat back.

4. An assembly as set forth in claim 1 wherein said actuator comprises an inflatable bladder supported by said frame.

5. An assembly as set forth in claim 1 wherein said resilient frame includes a plurality of coil springs suspended from said seat back.

6. An assembly as set forth in claim 5 wherein said frame includes stringers suspended by said coil springs and a plurality of wires attached between said stringers.

7. An assembly as set forth in claim 1 wherein said frame further includes first and second frames with said first frame extending forwardly in a cantilevered fashion from said first side of said seat back and said second frame extends forwardly in a cantilevered fashion from said second side of said seat back, said actuator further including first and second actuators with said shaped form secured to said cover over said first actuator and a second shaped form secured to said cover over said second actuator, said first and second actuators being individually actuatable to effect a respective movement of said forms with each of said forms and said frames being independently movable in response to pressure applied by an occupant.

* * * * *